(12) United States Patent
Pei et al.

(10) Patent No.: US 11,622,438 B2
(45) Date of Patent: Apr. 4, 2023

(54) LIGHTING APPARATUS

(71) Applicant: XIAMEN ECO LIGHTING CO. LTD., Xiamen (CN)

(72) Inventors: Chunyu Pei, Xiamen (CN); Zongyan Liu, Xiamen (CN); Bin Liu, Xiamen (CN); Yueqiang Zhang, Xiamen (CN); Liangliang Cao, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

(21) Appl. No.: 17/486,144

(22) Filed: Sep. 27, 2021

(65) Prior Publication Data

US 2022/0104332 A1 Mar. 31, 2022

(30) Foreign Application Priority Data

Sep. 25, 2020 (CN) .......................... 202011025403.3

(51) Int. Cl.
*H05B 47/19* (2020.01)
*H05B 45/20* (2020.01)
*H05B 45/325* (2020.01)
*H05B 45/10* (2020.01)

(52) U.S. Cl.
CPC ............. *H05B 47/19* (2020.01); *H05B 45/10* (2020.01); *H05B 45/20* (2020.01); *H05B 45/325* (2020.01)

(58) Field of Classification Search
CPC ........ H05B 47/19; H05B 45/10; H05B 45/20; H05B 45/325; H05B 45/3725; Y02B 20/30
See application file for complete search history.

(56) References Cited

U.S. PATENT DOCUMENTS

2018/0070419 A1* 3/2018 Girard .................. H05B 47/195
2018/0317306 A1* 11/2018 Harris ................... H05B 45/00

* cited by examiner

*Primary Examiner* — Minh D A
(74) *Attorney, Agent, or Firm* — Chun-Ming Shih; Lanway IPR Services

(57) ABSTRACT

A lighting apparatus includes an external controller, a first LED module, a second LED module, a rectifier, a power switch, a manual switch, a light housing and an allocation module. The external controller converts an external signal of an external wall switch to a light intensity signal. The external controller is coupled to the external wall switch. The wall switch is a continuous switch for a user to select a continuous value from a range. The first LED module and the second LED module emit lights of different color temperatures. The rectifier for converts an AC power to a DC power. The power switch is coupled to the rectifier for generating a driving current corresponding to the light intensity signal. The manual switch selects a color temperature setting.

18 Claims, 7 Drawing Sheets

LIGHTING APPARATUS

FIELD

The present invention is related to a lighting apparatus, and more particularly related to a lighting apparatus with a flexible setting.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

People expect to have more control over light devices. Sometimes they may use remote controls or just mobile phones with corresponding apps.

However, if the structure is too complicated, the manufacturing cost is increased. Therefore, it is important to provide a simple design with flexible configuration.

SUMMARY

In some embodiments, a lighting apparatus includes an external controller, a first LED module, a second LED module, a rectifier, a power switch, a manual switch, a light housing and an allocation module.

The external controller converts an external signal of an external wall switch to a light intensity signal.

The external controller is coupled to the external wall switch.

The wall switch is a continuous switch for a user to select a continuous value from a range.

The first LED module and the second LED module emit lights of different color temperatures.

The rectifier for converts an AC power to a DC power.

The power switch is coupled to the rectifier for generating a driving current corresponding to the light intensity signal.

The manual switch selects a color temperature setting.

The light housing is used for disposing the light source set, the rectifier, the power switch, the internal controller and the manual switch.

The internal controller is coupled to the manual switch for converting the color temperature setting to a color temperature control signal.

The allocation module divides the driving current to the first LED module and the second LED module according to the color temperature control signal.

In some embodiments, the color temperature control signal includes a first PWM signal and a second PWM signal respectively corresponding to a first current supplied to the first LED module and a second current supplied to the second LED module.

In some embodiments, the wall switch is a rotator dimmer switch.

In some embodiments, the power switch receives the color temperature control signal and further adjusts the driving current according to the color temperature control signal.

In some embodiments, an overall light intensity of the lighting apparatus is adjusted higher in a first color temperature than in a second color temperature.

The first color temperature is higher than the second color temperature.

In some embodiments, an overall light intensity of the lighting apparatus is adjusted lower in a first color temperature than in a second color temperature.

The first color temperature is higher than the second color temperature.

In some embodiments, the allocation module determines a first current to the first LED module and a second current to the second LED module according to current to light intensity ratios of the first LED module and the second LED module.

In some embodiments, the lighting apparatus may also include an intensity switch disposed on the light housing for a user to select a default light intensity in a continuous range.

In some embodiments, the default light intensity is also transmitted to the power switch for determine the driving current.

In some embodiments, the power switch has a rule module for determining a priority between the continuous value and the default light intensity.

In some embodiments, the power switch ignores the default light intensity when the external converter transmits the continuous value to the power switch.

In some embodiments, the range for selecting the continuous value by the external wall switch is between a first light intensity and a second light intensity.

The first light intensity and the second light intensity are both larger than zero.

In some embodiments, the allocation module generates a first current to the first LED module and a second current to the second LED module.

The first current and the second current are kept constant over time.

In some embodiments, the allocation module iterates supplying the driving current to the first LED module and the second LED module.

The first LED module and the second LED modules are not turned on at the same time.

In some embodiments, the light source set further includes a third LED module and a fourth LED module.

The first LED module is a red LED module.

The second LED module is a green LED module.

The third LED module is a blue LED module.

The fourth LED module is a white LED module of a first color temperature.

In some embodiments, the light source set further includes a fifth LED module.

The fifth LED module is a white LED module with a second color temperature larger than the first color temperature.

In some embodiments, the manual switch is also provided a user to set an eye-protection mode.

When the eye-protection mode is set, a current supplied to the blue LED module is decreased with a predetermined level.

In some embodiments, the lighting apparatus may also include a wireless module.

The wireless module collects the light intensity signal and the color temperature control signal for controlling a neighbor light device.

In some embodiments, the wireless module receives an external command for instructing the power switch to ignore the light intensity signal.

In some embodiments, the wireless module receives a color temperature setting from the neighbor light device.

The internal controller adjusts the color temperature control signal according to the received color temperature setting of the neighbor light device.

DETAILED DESCRIPTION

Figure 7:
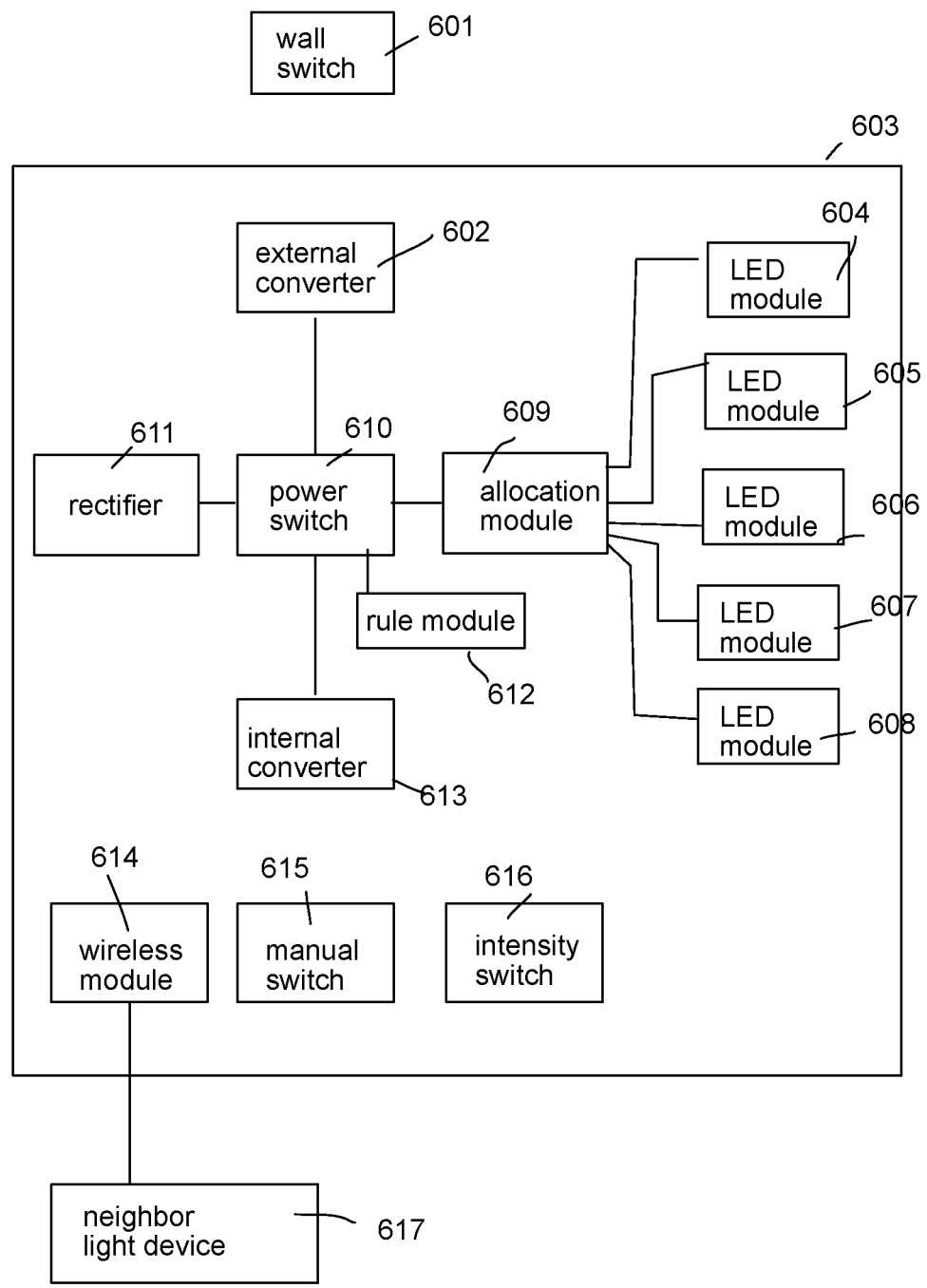
FIG. 7 illustrates another lighting apparatus embodiment.

In FIG. 7, a lighting apparatus includes an external controller 602, a first LED module 604, a second LED module 605, a rectifier 611, a power switch 610, a manual switch 615, a light housing 603 and an allocation module 609.

The external controller 602 converts an external signal of an external wall switch 601 to a light intensity signal. For example, the lighting apparatus is a downlight device installed in a cavity or a junction box in a ceiling. In addition to connect a power wire to the rectifier 611 for supplying an AC power source, e.g. 110V AC power, an external wall switch which is not disposed on the downlight device is also coupled to the downlight device electrically to control the downlight device.

The external controller 602 is coupled to the external wall switch 601.

The external wall switch 601 is a continuous switch for a user to select a continuous value from a range. For example, the external wall switch 601 may be a rotator switch that users may rotate the rotator switch to select any value among a continuous range, compared to a limited number of discrete options.

The first LED module 604 and the second LED module 605 emit lights of different color temperatures.

The rectifier 611 converts an AC power to a DC power.

The power switch 610 is coupled to the rectifier 611 for generating a driving current corresponding to the light intensity signal. For example, the external wall switch 601 is rotated to a 80%, even the lighting apparatus may emit a 100% light intensity, the power switch 610 lowers the overall light intensity to 80% of its maximum light intensity. Users may select any other value, e.g. 45%, 20.45% or any value.

The manual switch 615 is provided to users to select a color temperature setting. For example, users buy the lighting apparatus from a store. Users may need a warm light or a cool light depending on their needs. With such design, users may easily change the color temperature setting via the manual switch.

The manual switch 615 may be disposed on an exterior surface of the light housing 603.

The first LED module 604 and the second LED module 605 are belong to a light source set. The light source set may include more than two LED modules.

For example, in this example, the first LED module 604 is a red LED module, the second LED module 605 is a green LED module, the third LED module 606 is a blue LED module, the fourth LED module 607 is a first white LED module and the fifth LED module 608 is a second white LED module. The first white LED module and the second white LED module may have different color temperatures. With such design, the allocation module 609 dispatches corresponding currents to theses LED modules separately to mix a required color temperature.

With the arrangement of the five types of LED modules, the light adjustment is found very nice to human eyes. Meanwhile, such arrangement also provides a flexible architecture. For example, manufacturers may select different combinations to create different light devices for different needs.

The light housing 603 is used for disposing the light source set, the rectifier 611, the power switch 610, the internal controller 613 and the manual switch 615.

The internal controller 613 is coupled to the manual switch 615 for converting the color temperature setting to a color temperature control signal. The signals are invisible and thus are not illustrated on the drawings. However, with the components for sending the signals, the drawings are sufficient for persons of ordinary skilled in the art to understand the description in the claims and the disclosure of the specification.

The allocation module 609 divides the driving current to the first LED module 604 and the second LED module 605 according to the color temperature control signal. The dividing may be applied over time. For example, in a first time period, the current is supplied to the first LED module 604. In a next time period, the current is supplied to the second LED module 605. Then, again, the current is supplied to the first LED module 604 again.

In other design, the current may be separated into two separate current sources separately supplied to the first LED module 604 and the second LED module 605.

In some embodiments, the color temperature control signal includes a first PWM signal and a second PWM signal respectively corresponding to a first current supplied to the first LED module and a second current supplied to the second LED module.

PWM refers to Pulse Width Modulation. The PWM signal is a digital signal with its duty ratio representing a control value. The internal converter 613 may convert a setting of the manual switch 615 into multiple PWM signals. The allocation module 609 or the power switch 610 may generate corresponding currents to the first LED module 604 and the second LED module 605 according to the multiple PWM signals.

In some embodiments, the wall switch is a rotator dimmer switch. For example, the rotator dimmer switch is rotated by a user to move to a desired position to determine a setting for the overall light intensity.

In some embodiments, the power switch 610 receives the color temperature control signal and further adjusts the driving current according to the color temperature control signal.

In some embodiments, an overall light intensity of the lighting apparatus is adjusted higher in a first color temperature than in a second color temperature. In such case, the overall light intensity is adjusted with a predetermined level according to the required color temperature.

With experiments, inventors find that some people like to increase the overall light intensity in higher color temperature while some other people prefers the opposite settings.

The first color temperature is higher than the second color temperature.

In some embodiments, an overall light intensity of the lighting apparatus is adjusted lower in a first color temperature than in a second color temperature.

The first color temperature is higher than the second color temperature.

In some embodiments, the allocation module 609 determines a first current to the first LED module and a second current to the second LED module according to current to light intensity ratios of the first LED module and the second LED module.

In some embodiments, the lighting apparatus may also include an intensity switch 616 disposed on the light housing 603 for a user to select a default light intensity in a continuous range. In such design, there are two switches for users to set the overall light intensity. One is at a wall switch and the other is attached directly on the housing of the lighting apparatus.

In some embodiments, the default light intensity is also transmitted to the power switch for determine the driving current.

In some embodiments, the power switch has a rule module 612 for determining a priority between the continuous value and the default light intensity. For example, the rule module 612 may be a memory for storing a table showing the priority order of multiple settings.

In some embodiments, the power switch ignores the default light intensity when the external converter transmits the continuous value to the power switch.

In some embodiments, the range for selecting the continuous value by the external wall switch is between a first light intensity and a second light intensity.

The first light intensity and the second light intensity are both larger than zero.

In such design, even the rotator switch is close to zero position, the mapping of the position may still be adjusted to a predetermined level. For example, the range may be between 60% to 100%, instead of 0% to 100%.

In some embodiments, the allocation module 609 generates a first current to the first LED module and a second current to the second LED module.

The first current and the second current are kept constant over time. Specifically, such design makes the output light not blinking, e.g. quickly turn-on and turn-off repeatedly.

In some embodiments, the allocation module 609 iterates supplying the driving current to the first LED module and the second LED module.

The first LED module and the second LED modules are not turned on at the same time.

In some embodiments, the light source set further includes a third LED module and a fourth LED module.

The first LED module is a red LED module.

The second LED module is a green LED module.

The third LED module is a blue LED module.

The fourth LED module is a white LED module of a first color temperature.

In some embodiments, the light source set further includes a fifth LED module.

The fifth LED module is a white LED module with a second color temperature larger than the first color temperature.

In some embodiments, the manual switch 615 is also provided a user to set an eye-protection mode. For example, the manual switch 615 has a on/off button.

When the eye-protection mode is set, a current supplied to the blue LED module is decreased with a predetermined level. Blue light is therefore decreased for meeting the need of a group of users.

In some embodiments, the lighting apparatus may also include a wireless module 614.

The wireless module 614 collects the light intensity signal and the color temperature control signal for controlling a neighbor light device 617. In such design, only the lighting apparatus needs to be connected to the external wall switch. Other lighting devices may share the setting of the external wall switch and the manual switch of the lighting apparatus mentioned above. Such control expands to a group control from a signal machine control.

In some embodiments, the wireless module receives an external command for instructing the power switch to ignore the light intensity signal.

In some embodiments, the wireless module receives a color temperature setting from the neighbor light device 617.

The internal controller adjusts the color temperature control signal according to the received color temperature setting of the neighbor light device.

Figure 1:
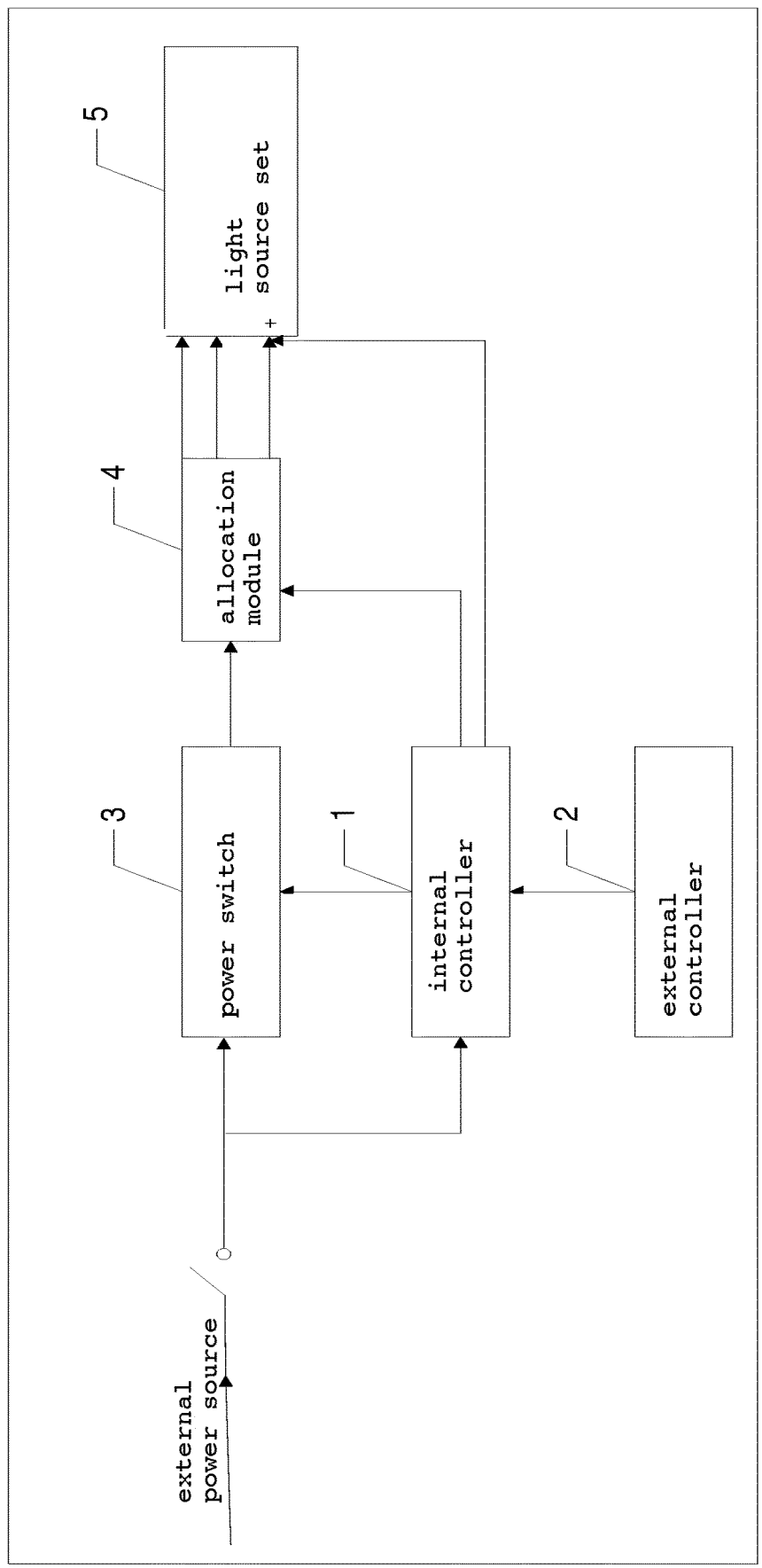
FIG. 1 illustrates a lighting apparatus embodiment.

Please refer to FIG. 1.

FIG. 1 shows a circuit diagram of the example mentioned above. In FIG. 1, the lighting apparatus receives an external power source. The power is converted and processed by the power switch 3. An internal converter 1 and an external converter 2 respectively receives and handles a manual switch and an external wall switch. The result of the light intensity defined by the external wall switch via the external converter 2 is further processed and integrated by the internal controller 1.

The power switch 3 generates a driving current that is divided by the allocation module 4 to supply corresponding sub-currents to multiple LED modules in a light source set 5.

Figure 2:
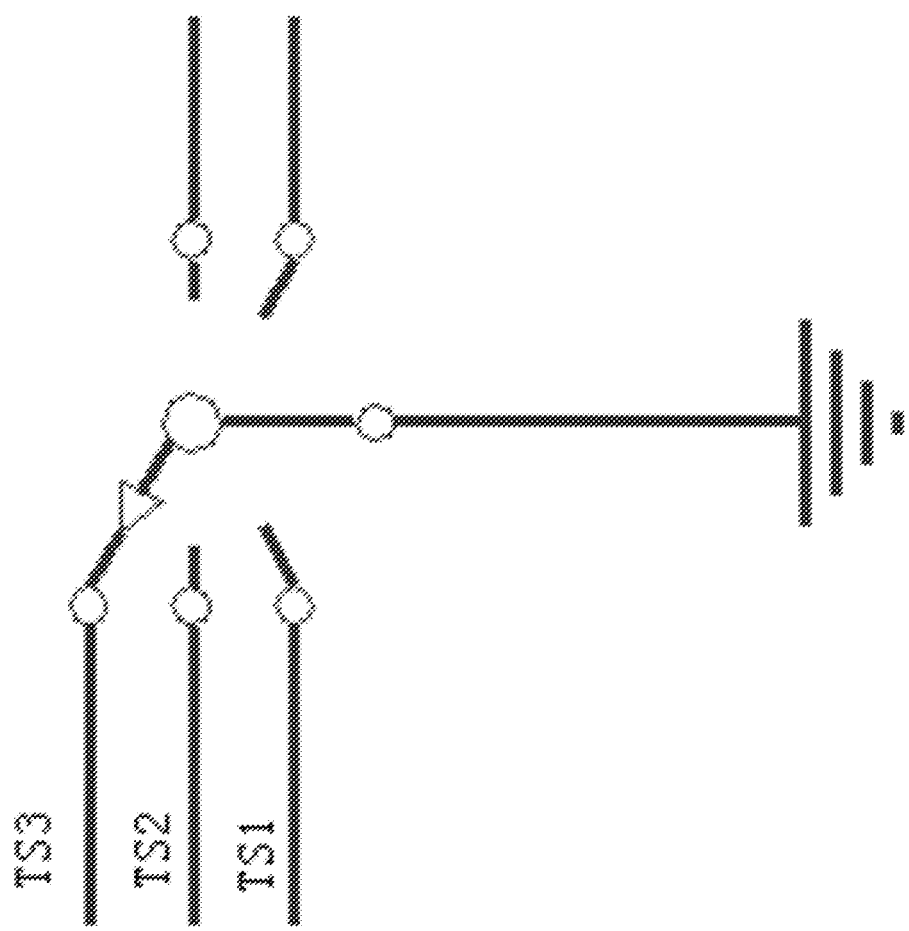
FIG. 2 illustrates a switch example.
Figure 3:
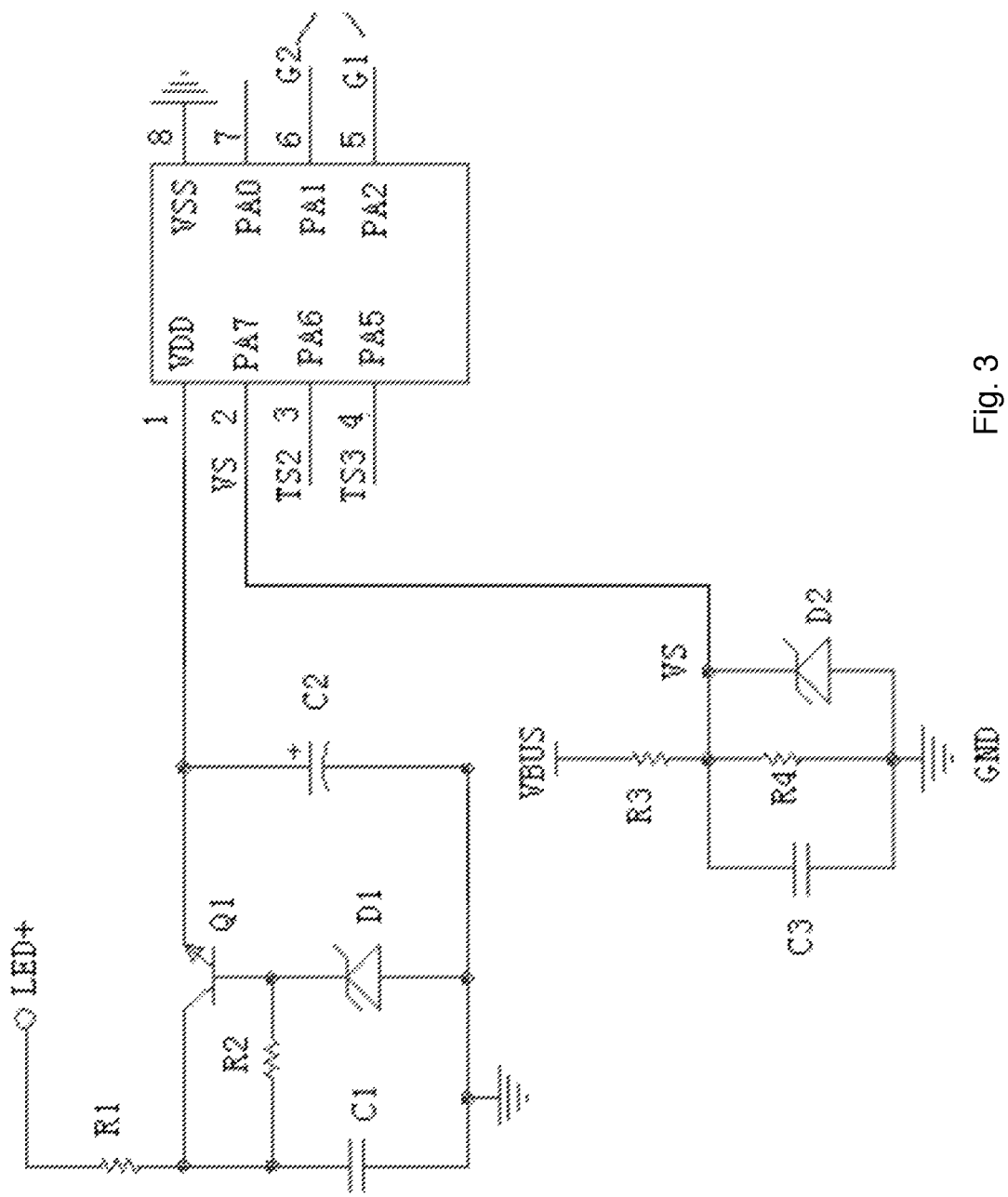
FIG. 3 illustrates a circuit diagram as an example for implementing an embodiment.
Figure 4:
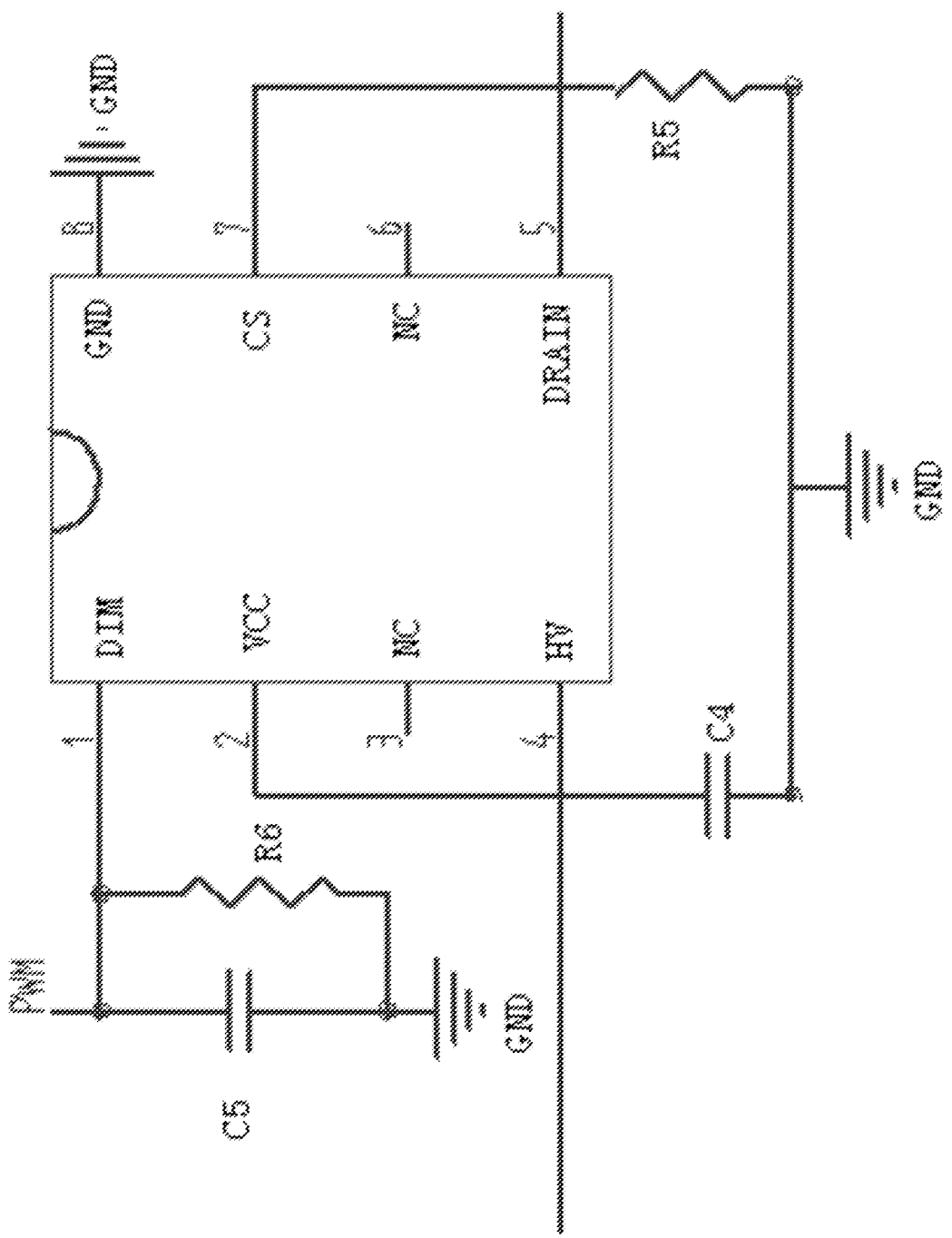
FIG. 4 illustrates another circuit diagram in the embodiment.
Figure 5:
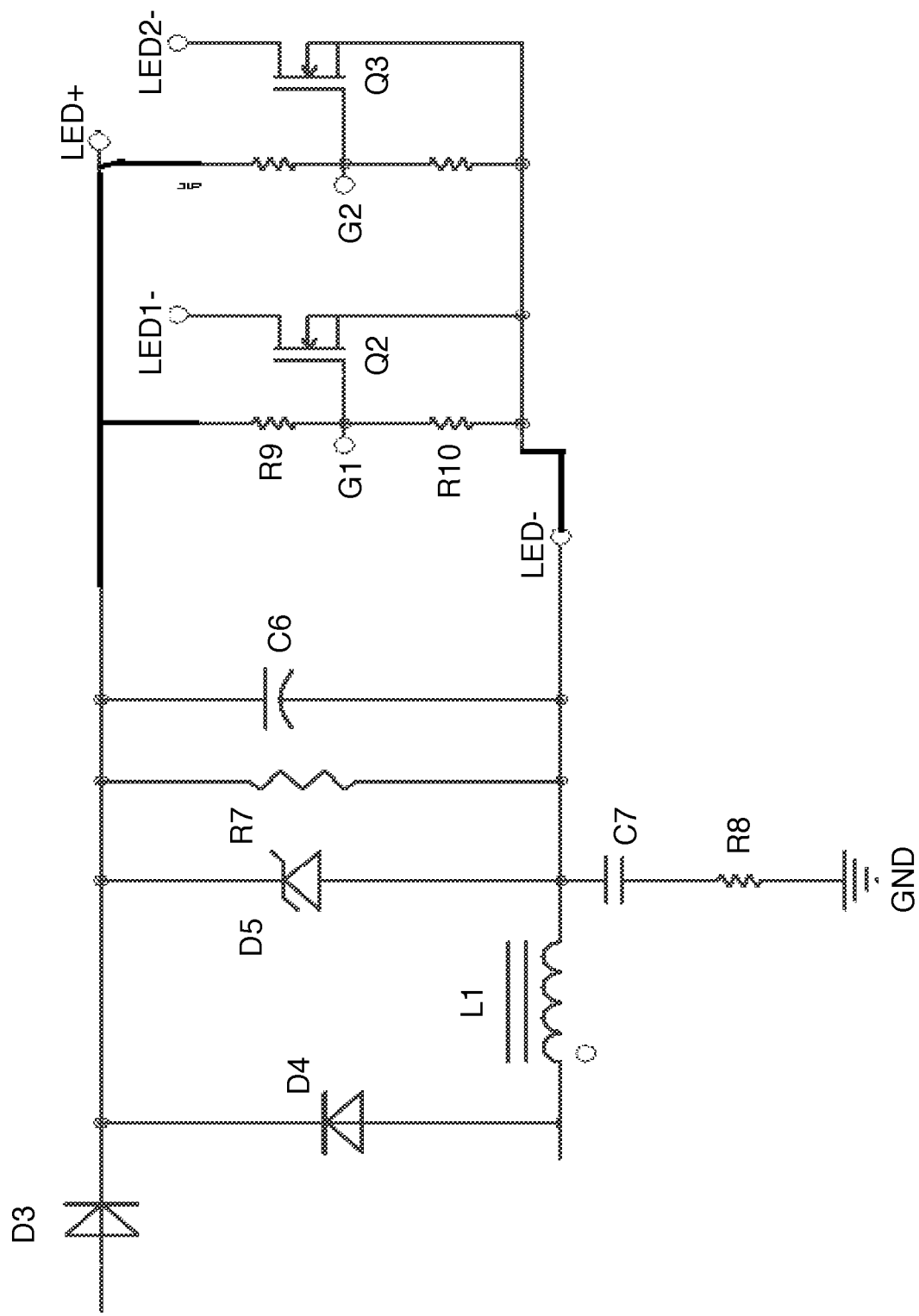
FIG. 5 illustrates another circuit diagram in the driver design.
Figure 6:
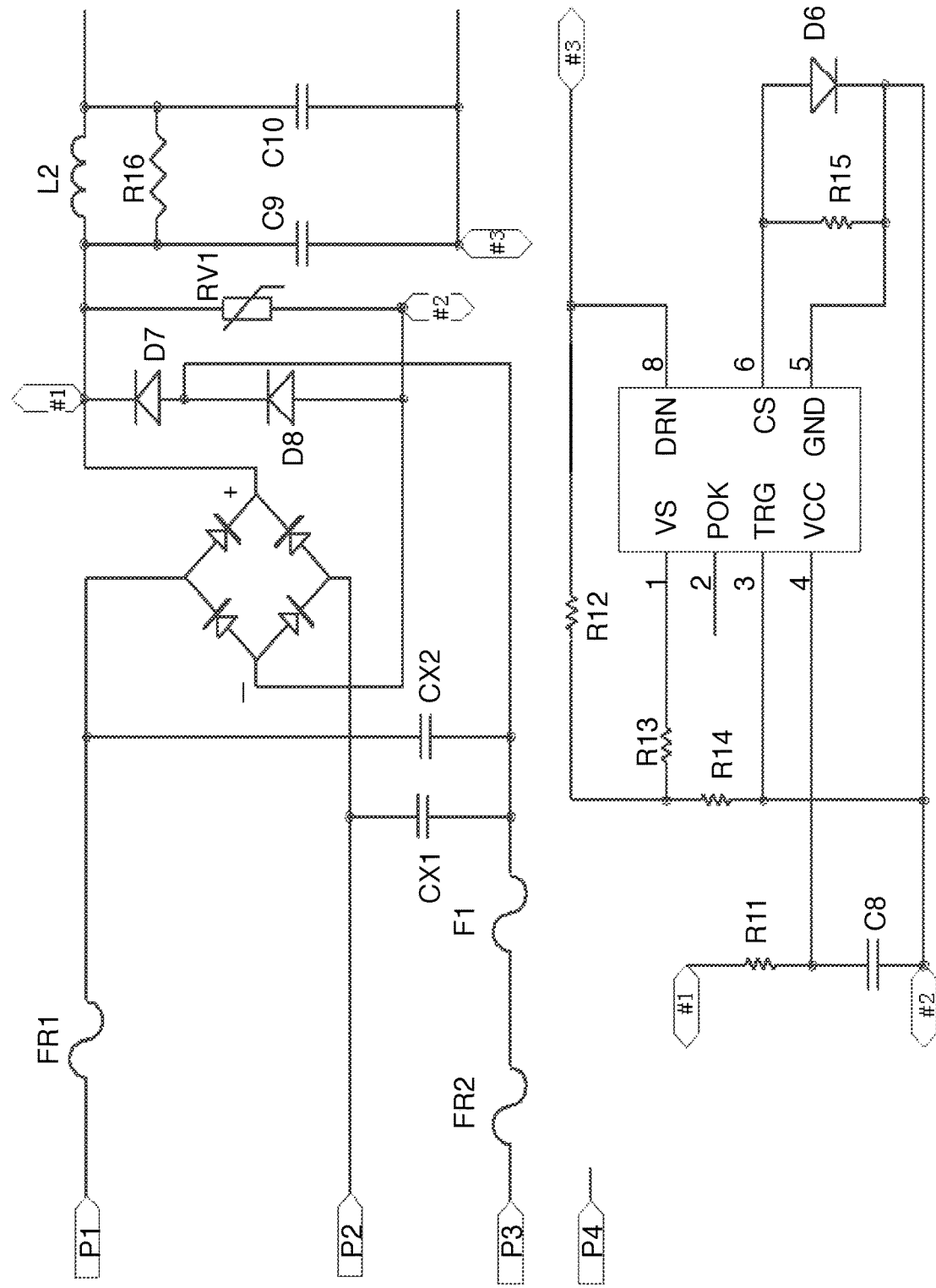
FIG. 6 illustrates another circuit diagram for the driver design reference.

FIG. 2 shows a switch for selecting from five color temperatures, which may be an example of the internal converter working with a manual switch.

FIG. 3 to FIG. 6 show a detail circuit example for implementing different parts of the example in FIG. 1.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
an external controller for converting an external signal of an external wall switch to a light intensity signal, wherein the external controller is coupled to the external wall switch, wherein the wall switch is a continuous switch for a user to select a continuous value from a range;
a first LED module of a light source set;
a second LED module of a light source, wherein the first LED module and the second LED module emit lights of different color temperatures;
a rectifier for converting an AC power to a DC power;
a power switch coupled to the rectifier for generating a driving current corresponding to the light intensity signal;
a manual switch for selecting a color temperature setting;
an internal controller;
a light housing for disposing the light source set, the rectifier, the power switch, the internal controller and the manual switch, wherein the internal controller is coupled to the manual switch for converting the color temperature setting to a color temperature control signal; and
an allocation module for dividing the driving current to the first LED module and the second LED module according to the color temperature control signal, wherein the power switch receives the color temperature control signal and further adjusts the driving current according to the color temperature control signal, wherein an overall light intensity of the lighting apparatus is adjusted higher in a first color temperature than in a second color temperature, wherein the first color temperature is higher than the second color temperature.

2. The lighting apparatus of claim 1, wherein the color temperature control signal comprises a first PWM signal and a second PWM signal respectively corresponding to a first current supplied to the first LED module and a second current supplied to the second LED module.

3. The lighting apparatus of claim 1, wherein the wall switch is a rotator dimmer switch.

4. The lighting apparatus of claim 1, wherein an overall light intensity of the lighting apparatus is adjusted lower in a first color temperature than in a second color temperature, wherein the first color temperature is higher than the second color temperature.

5. The lighting apparatus of claim 1, wherein the allocation module determines a first current to the first LED module and a second current to the second LED module according to current to light intensity ratios of the first LED module and the second LED module.

6. The lighting apparatus of claim 1, further comprising an intensity switch disposed on the light housing for a user to select a default light intensity in a continuous range.

7. The lighting apparatus of claim 6, wherein the default light intensity is also transmitted to the power switch for determine the driving current.

8. The lighting apparatus of claim 7, wherein the power switch has a rule module for determining a priority between the continuous value and the default light intensity.

9. The lighting apparatus of claim 7, wherein the power switch ignores the default light intensity when the external converter transmits the continuous value to the power switch.

10. The lighting apparatus of claim 1, wherein the range for selecting the continuous value by the external wall switch is between a first light intensity and a second light intensity, wherein the first light intensity and the second light intensity are both larger than zero.

11. The lighting apparatus of claim 1, wherein the allocation module generates a first current to the first LED module and a second current to the second LED module, wherein the first current and the second current are kept constant over time.

12. The lighting apparatus of claim 1, wherein the allocation module iterates supplying the driving current to the first LED module and the second LED module, wherein the first LED module and the second LED modules are not turned on at the same time.

13. The lighting apparatus of claim 1, wherein the light source set further comprises a third LED module and a fourth LED module, wherein the first LED module is a red LED module, wherein the second LED module is a green LED module, wherein the third LED module is a blue LED module, wherein the fourth LED module is a white LED module of a first color temperature.

14. The lighting apparatus of claim 13, wherein the light source set further comprises a fifth LED module, wherein the fifth LED module is a white LED module with a second color temperature larger than the first color temperature.

15. The lighting apparatus of claim 14, wherein the manual switch is also provided a user to set an eye-protection mode, wherein when the eye-protection mode is set, a current supplied to the blue LED module is decreased with a predetermined level.

16. The lighting apparatus of claim 1, further comprising a wireless module, wherein the wireless module collects the light intensity signal and the color temperature control signal for controlling a neighbor light device.

17. The lighting apparatus of claim 16, wherein the wireless module receives an external command for instructing the power switch to ignore the light intensity signal.

18. The lighting apparatus of claim 16, wherein the wireless module receives a color temperature setting from the neighbor light device, wherein the internal controller adjusts the color temperature control signal according to the received color temperature setting of the neighbor light device.

* * * * *